(12) United States Patent
Kokkonen et al.

(10) Patent No.: US 7,269,426 B2
(45) Date of Patent: Sep. 11, 2007

(54) METHOD FOR THE PROVISION OF LOCATION INFORMATION

(75) Inventors: Petri Kokkonen, Espoo (FI); Janne Muhonen, Helsinki (FI); Jan Ignatius, Espoo (FI); Sebastian Kraufvelin, Tenhola (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/438,399

(22) Filed: May 23, 2006

(65) Prior Publication Data

US 2006/0211432 A1 Sep. 21, 2006

Related U.S. Application Data

(63) Continuation of application No. 10/492,844, filed as application No. PCT/IB02/04292 on Oct. 16, 2002.

(30) Foreign Application Priority Data

Oct. 17, 2001 (GB) ................................. 0124956.4
Oct. 30, 2001 (GB) ................................. 0126008.2

(51) Int. Cl.
*H04Q 7/20* (2006.01)

(52) U.S. Cl. ............................... 455/456.1; 455/456.2; 455/456.3; 455/457; 455/411

(58) Field of Classification Search ................ 455/456, 455/411, 414, 432, 457, 456.1, 456.2, 456.3
See application file for complete search history.

(56) References Cited

U.S. PATENT DOCUMENTS

| 6,311,069 B1 | 10/2001 | Havinis et al. |
| 6,662,014 B1* | 12/2003 | Walsh ..................... 455/456.2 |
| 2001/0048364 A1* | 12/2001 | Kalthoff et al. .......... 340/573.1 |
| 2002/0145561 A1 | 10/2002 | Sandhu et al. |
| 2002/0156646 A1* | 10/2002 | Kaiwa et al. ................. 705/1 |
| 2003/0023726 A1 | 1/2003 | Rice et al. |

FOREIGN PATENT DOCUMENTS

| EP | 1061756 | 12/2000 |
| WO | WO98/52379 | 11/1998 |
| WO | WO99/43173 | 8/1999 |
| WO | WO 02/17656 A2 | 2/2002 |

* cited by examiner

*Primary Examiner*—Matthew Anderson
*Assistant Examiner*—Tuan Pham
(74) *Attorney, Agent, or Firm*—Squire, Sanders & Dempsey L.L.P.

(57) ABSTRACT

In a communication system a request for location information associated with a target user is signalled from an entity. Said request contains information identifying the requestor of said location information. A verification is performed based on said identifying information if the target user has authorized the requester to initiate provision of location information that associates with the target user. The location information provision is initiated if it is determined that the requester is authorised by the target user to initiate provision of location information that associates with the target user.

20 Claims, 3 Drawing Sheets

METHOD FOR THE PROVISION OF LOCATION INFORMATION

This application is a continuation of U.S. patent application Ser. No. 10/492,844 filed on May 13, 2004, which is a National Stage of PCT/IB02/04292 filed on Oct. 16, 2002, and claims priority from GB 0126008.2 filed on Oct. 30, 2001 and GB 0124956.4 filed on Oct. 17, 2001, the contents of which are incorporated by reference in their entirety.

FIELD OF THE INVENTION

The present invention relates to provision of location information by means of a communication system.

BACKGROUND OF THE INVENTION

Communication systems providing mobility for the users thereof are known. A well known example of the mobile communication systems is the public land line mobile network (PLMN), a cellular communication network being an example of the PLMN. Another example is a mobile communication system that is based, at least partially, on use of communication satellites.

The mobile network apparatus and/or user equipment such as a mobile station can be employed for provision of information regarding the geographical location of the user equipment and thus the user thereof. A mobile user equipment and thus the user thereof can be positioned by various different techniques. For example, substantially accurate geographical location information that associates with a user equipment can be obtained based on the known satellite based GPS (Global Positioning System). More accurate location information can be obtained through a differential GPS.

Another possibility is to use a location service that associates with a cellular telecommunications system for the provision of the location information. In this approach the cells or similar geographically limited radio access entities and associated controllers of the communication system are utilised in production of at least a rough location information estimate concerning the current location of the mobile user equipment. To improve the accuracy of the location information the communication system may be provided with specific location measurement units that provide more accurate data concerning the location of a user equipment within the service area of the cellular system. It is also possible to conclude geographical location when the mobile user equipment is located within the coverage area of a visited or "foreign" network. The visited network may be made capable of transmitting the location of the mobile user equipment back to the home network, e.g. to support services that are based on location information or for the purposes of routing and charging. The production of data for the location determinations does not form an essential element of the present invention, and is thus not described in any greater detail herein.

The location data may be processed in a specific location service entity that is implemented either within the cellular system or connected thereto. The location data may also be processed in the user equipment that is provided with appropriate processing capacity. The location service entity provided by the communication system may serve different clients via an appropriate interface.

The location information may be used for various purposes, such as for location of a mobile telephone that has made an emergency call, for locating vehicles or given mobile subscribers and so on. In general, a client such as a user equipment or another entity wishing to receive location information regarding a user equipment may send a request for such information to the location service provision entity. The location service provisioning entity will then process the request, obtain the required data and generate an appropriate response.

An example of the provision of the location information by a PLMN is described in more detail $3^{rd}$ Generation Partnership Project (3GPP) technical specifications, see e.g. 3GPP TS 23.271 version 4.2.0, titled "Functional stage 2 description of LCS", June 2001.

According to the 3GPP specification a location service (LCS) server entity referred to as a Gateway Mobile Location Center (GMLC) is provided for managing the location services. The GMLC is for gathering and storing various data that may be used in provision of location information for location service clients (LCS clients).

The LCS Client may make use of that location information for various services/applications. A possible application comprises a LCS client arranged to provide location information in response to a request for non-call related location information. Such a request for location information is referred to in the 3GPP specifications as a non-call related MT-LR (Mobile Terminated Location Request).

Use of a so called "Authorized UE List" has been proposed. This list contains Mobile Subscriber ISDN (MSISDN) numbers or groups of MSISDNs which are to initiate a location information provision procedure. That is, MSISDNs or groups of MSISDN are listed for which the LCS Client may issue a non-call related MT-LR. Separate lists of MSISDNs may be associated with each distinct external or non-call related client identity. Location information may be provided by the LCS server to the LCS client in response to a request for location information from a user with a MSISDN number that appears in said list.

The LCS Client who is external to the PLMN system may only be enabled to validly issue location information requests for those MSISDNs which are found on the "Authorized UE List". That is, the LCS clients request may only be responded for subscribers who subscribe to the location services provided by the PLMN, as their MSISDNs would not otherwise appear on the list.

Request from the LCS Client are authenticated based on a combination of a Client ID and password stored in a LCS Client profile at the LSC server (e.g. the GMLC) and authorized based on the "Authorized UE List". That is, the LCS client is to receive location information from the GMLC entity if the requesting user equipment (UE) is found from the list.

The inventors have found that there is no mechanism for the target mobile user equipment, and more particularly, to the user thereof, to selectively prevent provision of information about their location. The users may not select provision of a certain location service application (or certain applications) and at the same time restrict any such parties that are allowed by the location service system to request for location information regarding any other user equipment.

A simple example of this type of service is the so called "Friends Find" application. In here a target user cannot control the users who are allowed to receive location information about the target user's location. A request for location information may not be rejected if the LCS client is allowed to receive the location information from the LCS server.

However, the inventors believe that there is a need for a solution by means of which a user of a target user equipment could select to who are to receive such information and to be able to prevent provision of location information to any unwanted requesters.

Furthermore, LCS clients are typically Application Service Providers (ASP) who are not a part of the PLMN system. Therefore the operator of the PLMN may not be able to control the behaviour of the LCS client. This may cause security concerns among subscribers who have privacy concerns and who would like to restrict the accessibility to location data associated with them.

SUMMARY OF THE INVENTION

Embodiments of the present invention aim to address one or several of the above problems.

According to one aspect of the present invention, there is provided a method in a communication system, the method comprising: signalling a request for location information associated with a target user, said request containing information identifying the requestor of said location information; verifying based on said identifying information if the target user has authorised the requester to initiate provision of location information that associates with the target user; and if the requester is authorised by the target user to initiate provision of location information that associates with the target user, initiating the provision of said location information.

According to another aspect of the present invention there is provided a communication system comprising: a location information provision entity; communication media for signalling from a client entity to the location information provision entity a request for location information associated with a target user, said request containing information identifying the requester of said location information; and verification means for verifying based on said identifying information if the target user has the requester, wherein provision of location information that associates with the target user can be initiated only if such is given.

According to another aspect of the present invention there is provided a location service server for use in a communication system, the location service server being arranged to receive a request for location information associated with a target user, said request containing information identifying the requester of said location information and to verify based on said identifying information if the target user has authorised the requester, whereby the location service server authorises provision of location information that associates with the target user only for requesters the by the target user.

According to another aspect of the present invention there is provided a user equipment for communication via a communication system, the user equipment being arranged to receive and process messages that associate with provision of information about the location of the user equipment, and to authorise provision of such information.

In a more specific form the request is generated at a user equipment of the requester and signalled to a location service client entity adapted for provision of location services for the users of the communication system.

Location information associated with the target user may be provided only for requesters who are determined by the target user as being authorised to receive information associated with the location of the target user.

At least a part of information about the authorisations by the target user may be stored in storage means provided in the communication system and/or in a second communication system and/or at the user equipment of the target user.

The verification may comprise verifying if an identifier of the requester can be found from a list of identifiers associated with the target user.

Said identifying information may be signalled to the user equipment of the target user for the authorisation. The identifier information may comprise n unique code or a name. The name may be in the form of a character string. Initiation of provision of location information may then be authorised or denied at the user equipment of the target user in response to receiving said identifying information. The user of the user equipment may authorise requesters on a case by case basis.

An identifier may be translated to a format based on which the verification can be performed.

Information about the by the authorisations target user that is stored in storage means may be modified by means of the user equipment of the target user.

The embodiments of the invention may provide a user with a possibility to allow or deny positioning requests from specific requestors. In some embodiments the determination may be done on a case by case basis. Thus the privacy control of individual user may be enhanced. A list of allowed can be implemented in a secure environment, e.g. in a telephone operator's network. The storage of information about the authorised requestors may be used to prevent distributions of this information to several entities, such as to a plurality of Application Service Providers (ASPs). Instead, the information about the authorised requestors may be kept unknown to the ASPs whereby the risk of misuse of this information can be reduced. Functions such as privacy checking and authorisation management may be concentrated into the operator's domain.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
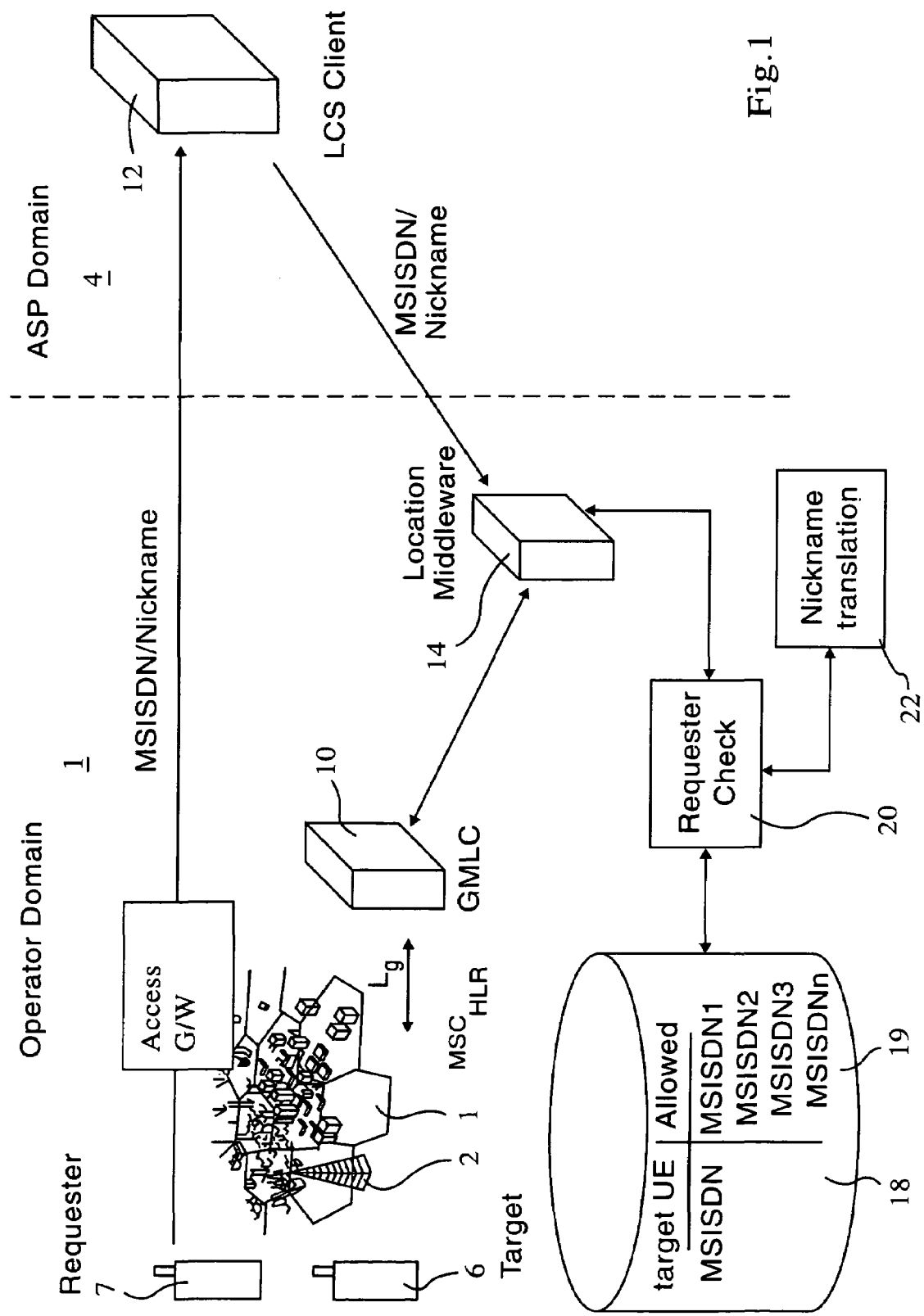
FIG. 1 shows an embodiment of the present invention.
Figure 2:
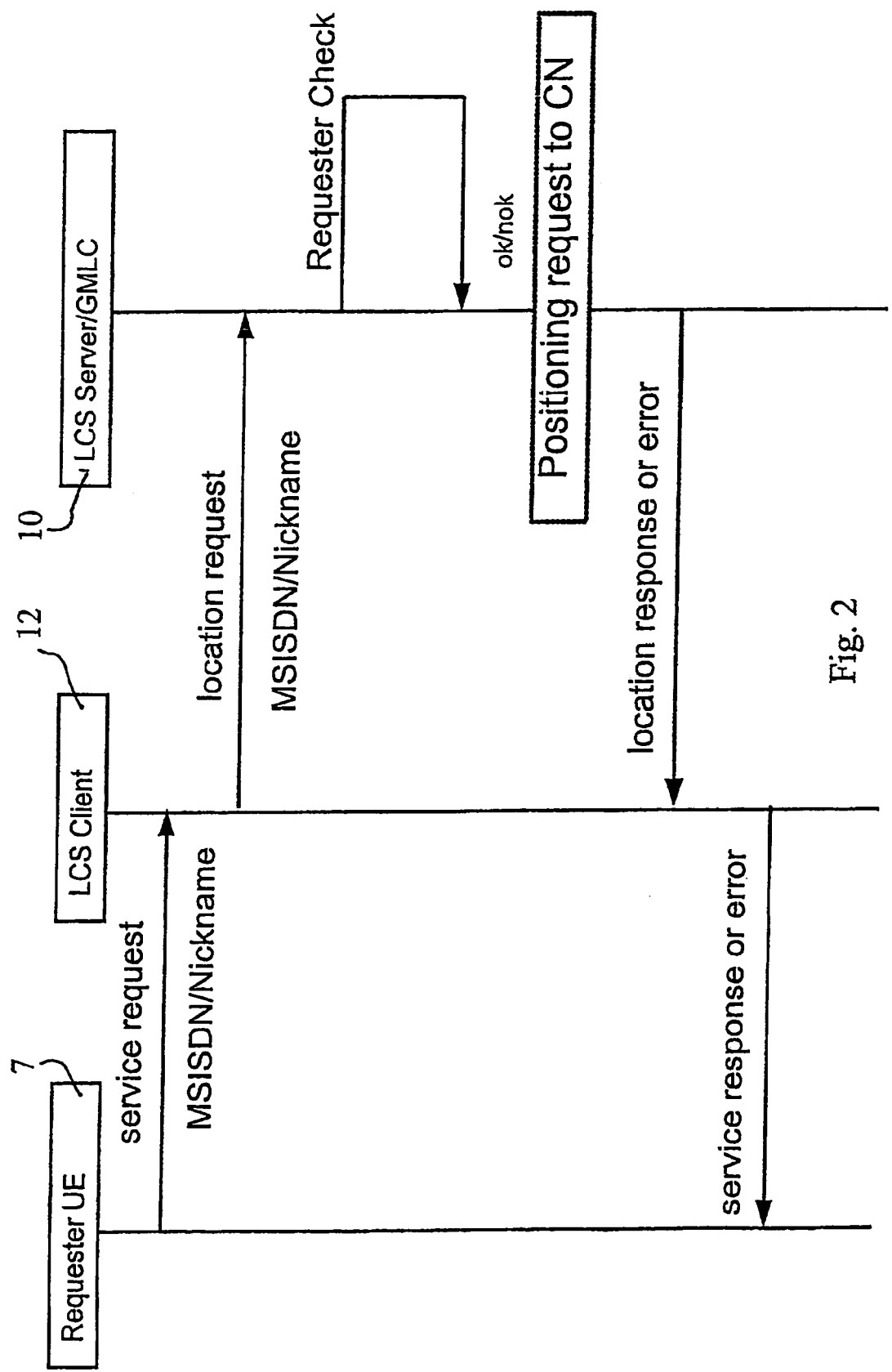
FIG. 2 is a signalling flowchart in accordance with an embodiment.
Figure 3:
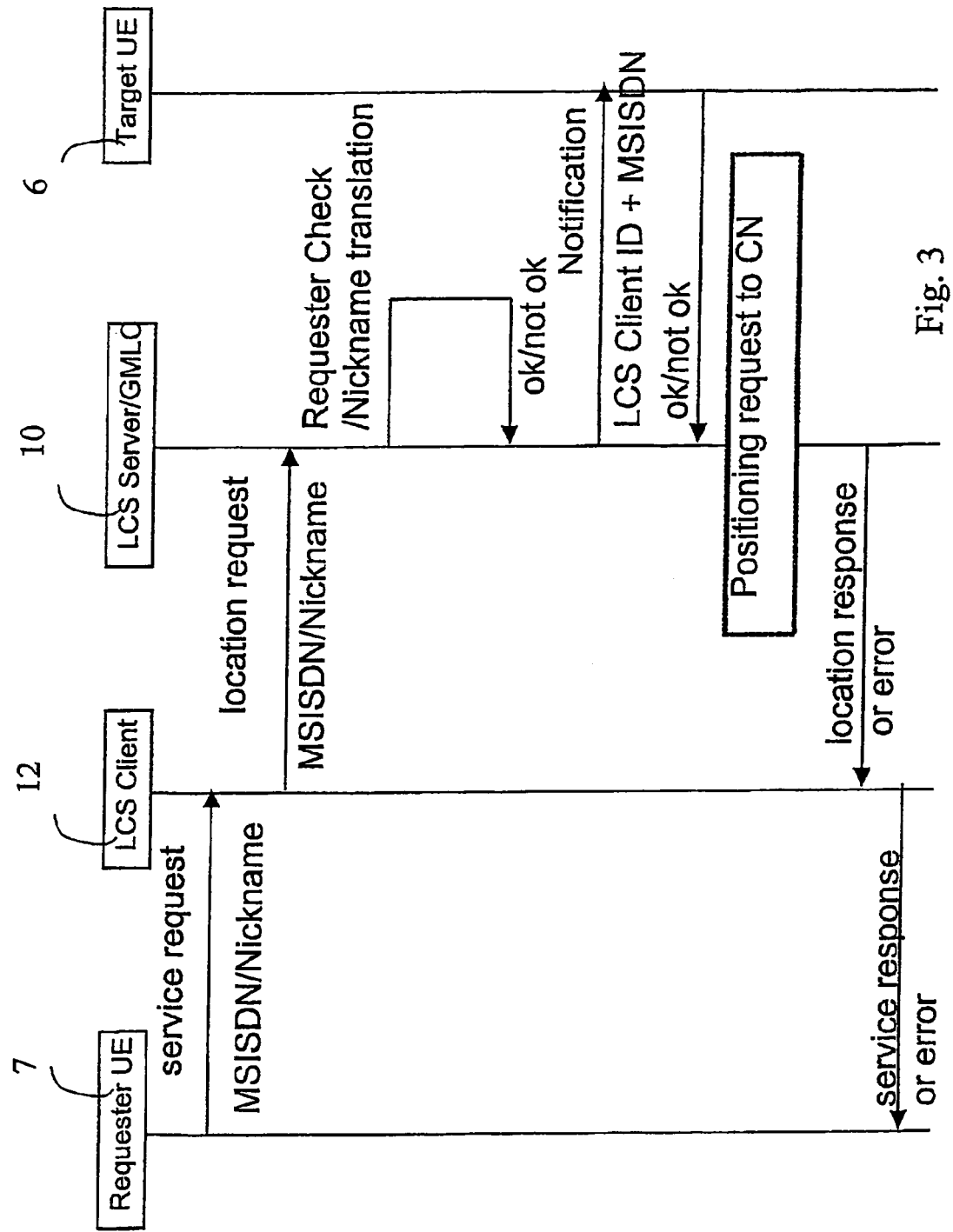
FIG. 3 is a signalling flowchart in accordance with another embodiment.

Before explaining possible operation in accordance with the principles of the invention in more detail with reference to FIGS. 2 and 3, a reference is made to FIG. 1 which is a simplified presentation of a cellular system providing location services. It should be appreciated that even though the exemplifying telecommunications network shown and described in more detail uses the terminology of the third generation (3G) UMTS (Universal Mobile Telecommunications System) public land mobile network (PLMN), the proposed solution can be used in any system providing mobile communications for users and some kind of location information service. Examples of other telecommunications systems include, without limiting to these, standards such as the GSM (Global System for Mobile communications) or various GSM based systems (such as GPRS: General Packet Radio Service), AMPS (American Mobile Phone System) or DAMPS (Digital AMPS), IMT 2000 (International Mobile Telecommunications system 2000), i-phone and so on.

More particularly, FIG. 1 shows an arrangement in which base stations 3 (only one shown for clarity) of the cellular system 1 provide radio coverage areas i.e. cells 2. Each radio coverage area 2 is typically served by a base station. It should be appreciated that one cell may include more than one base station site. A base station apparatus or site may also provide more than one cell. The shape and size of the cells 2 depend on the implementation and may be different from the illustrated shapes. The shape and size of the cells may also vary from cell to cell. It should be appreciated that in some systems the base station may be referred to as Node B.

Two user equipment such as mobile stations (MS) 6 and 7 are also shown. It shall be appreciated that typically a number of user equipment will be in communication with each base station although only two user equipment 6 and 7 are shown in FIG. 1 for clarity. Each base station is arranged to transmit signals to and receive signals from the mobile user equipment (UE) 6 and 7 via a wireless interface. Likewise, the user equipment 6 and 7 are able to transmit signals to and receive signals from the base stations.

Each of the base stations is connected to an access network controller such as a radio network controller (RNC) of a UMTS terrestrial radio access network (UTRAN). The radio network controller may be connected to appropriate core network entities of the cellular system, such as a MSC (mobile switching centre) and/or SGSN (serving general packet radio service support node) 11, via a suitable interface arrangement. These, however, do not form an essential element of the invention and are thus not explained in any greater detail.

The location of a mobile user equipment may vary in time as the user equipment is free to move within the coverage area of a base station and also from a coverage area to another coverage area. The modern communication systems are capable of providing information regarding the geographical location of a user equipment within the coverage area thereof. The geographical location may be defined on the basis of the position of the mobile station relative to the base station(s) of the mobile telecommunications network.

The geographical location of the user equipment may be defined, for example, in X and Y co-ordinates or in latitudes and longitudes. A possibility is to use the relation between defined radiuses and angles, e.g. based on the spherical coordinate system or alike. It is also possible to define the location of the base stations and/or mobile stations in vertical directions. For example, Z co-ordinate may be used when providing the location information in the vertical direction. The vertical location may be needed e.g. in mountainous environments or in cities with tall buildings.

In FIG. 1 the location service (LCS) functionality of the communication system is provided by a Gateway Mobile Location Center (GMLC) entity 10. The GMLC location service node 10 is for gathering and storing data that is required for the provision of the location information. The location service node 10 is arranged to receive via appropriate interface means information concerning the location of the mobile user equipment from the cellular system.

The cellular system may be provided with various different means for processing information gathered from the cells and/or some other parameters and/or for computing by processor means appropriate calculations for determining and outputting the geographical location of the target user equipment. The location information may be obtained by using one or more of the appropriate location techniques. At least a part of the location information may be provided based on information provided by system that is separate from the communication system, such as by means of the Global Positioning System (GPS) or similar. Since there are various possibilities how to implement the location services in the cellular system and since the invention is not dependent on the used location determination technology, these are not be described in any greater detail herein.

In order to be able to separate the user equipment from each other, the locations service entity 10 is capable of processing at lest one form of identifiers. The identity information may be provided e.g. by means of a mobile subscriber ISDN number (MSISDN), an international mobile subscriber identifier (IMSI) or a temporary identifier (such as a temporary international mobile subscriber identifier TIMSI) of the mobile user equipment, passwords, or any other form of identifier that can be reliably used for identifying a user equipment and/or a user.

The location service node may be implemented in the core network by means of a LCS server entity 10. The LCS server 10 is arranged to receive location information from the radio access network via appropriate controller entities such as the MSC and/or SGSN connected by the appropriate interface means to the access network.

This location service node may provide the location information in a predefined manner to a location services (LCS) client 12. A LCS Client 12 can be any entity that makes use of the location information. The LCS client 12 can be seen as a logical functional entity that may make a request to the location service entity 10 for the location information of one or more target user equipment.

As shown by FIG. 1, the LCS client 12 may be an entity that is external to the communication network 1, the client entity 12 being provided in an ASP domain 4. The LCS client may also be an internal client (ILCS) i.e. reside in any entity or node (including the mobile station) within the communication system 1.

The LCS clients are entitled to receive at least some degree of information concerning the location (or location history) of a target user equipment. The particular requirements and characteristics of a LCS Client are typically known to the location service server of the communication system by its LCS client subscription profile. As will be described in more detail below, particular restrictions associated with each target user equipment may also be defined.

The location service server 10 may consist of components and bearers needed to serve the LCS client 12. The server 10 may provide a platform which will enable the support of location based services in parallel with other telecommunication services such as speech, data, messaging, other teleservices, user applications and supplementary services. The LCS Server 10 may thus provide the client 12, on request or periodically, the current or most recent geographic location (if available) of the target user equipment or, if the location fails, an error indication and optionally the reason for the failure. A more detailed description of a LCS entity that may be employed in the embodiments of can be found e.g. from the above referenced 3GPP technical specification No. 3GPP TS23.271.

In FIG. 1 the LCS client 12 forms an entity that is capable of providing on request information concerning the geographical location of a target user equipment 6. Such location information may be requested by clients such as the user equipment 7 (the requester). However, as explained in more detail below, the arrangement is such that a response is provided only to those location requests that originate from a properly authorised clients of the LCS client 12. The provision may be initiated only if requirements regarding the privacy of the target user equipment 6 are satisfied.

In accordance with an embodiment a separate network entity is provided for the purposes of verifying if a requestor is entitled to received location information regarding a specific target user equipment. The parties of the location request (i.e. the requestor and the target) may be identified based on appropriate identifiers. A possible identifier may be based on a Mobile Subscriber ISDN (MSISDN) number that is unique for each mobile subscriber.

In FIG. 1 the verification function is provided by a network server entity 14 referred to as a Location Middleware. The server entity 14 is provided in the core network side of the communication system 1. The Location Middleware server entity 14 is for handling the requests received from the LCS client application 12 and for deciding how to proceed with the requests. The server 14 has advanced control function to send the request to different types of location servers (e.g. the GMLC node 10).

This server entity 14 may also provide control of features such as Subscriber Privacy, Subscriber Authentication, System Control and System Operations functions. The Location Middleware server allows service level separation to ensure privacy of the subscribers and to enable verification of the service requestors.

The server entity 14 is shown to comprise a database 18 for storing a list 19 wherein target user equipment identities and allowed user equipment identities are associated to each other. That is, the database 18 provided a link between the target user equipment 6 (and this the user thereof) and any user equipment that is allowed by the user of the target user equipment to receive location information concerning the target user equipment 6.

The target user equipment 6 may be provided with a user interface and other necessary means for modifying the list restrictions. For example, the target user equipment may be arranged to display a menu for the user by means of which the user may add a name or user equipment identifier to the list 19 or remove a name or user equipment identifier from the list 19. According to a possibility the list can be managed by accessing a management document in a web server.

The server is also shown to include a requester check function 20. A nickname translation function 22 is shown to be associated with the check function 20. Example of the operation of these entities will be described in the following with reference to FIGS. 2 and 3.

It shall be appreciated that the separate verification server 14 is not a necessity. At least a part of the functions of the server entity 14 may be provided by the location service entity 10. For example, the functionality of checking if the "Requester" is or not may be provided by mean of the GMLC holding also the "Authorized UE List" discussed above. Therefore the Location Middleware of the FIG. 1 embodiment may also be seen as a logical functionality that is not tied to any physical element of the network.

In accordance with an embodiment shown in FIG. 2 the originator of a request i.e. the requestor user equipment 7 signals a service request for information regarding the location of the target user equipment 6. An identifier parameter is added in an appropriate element of the request, the request thus containing an identifier such as the MSISDN or a nickname of the requestor.

The identifier parameter identifying the requester is passed to the location service entity 10 form the LCS client 12. Based on the identity information the requester may be checked by the check function 20 against the list 19 of authorised requestors in the database 18. If the identifier is among the identities which are allowed to receive information regarding the target user equipment determinations regarding the location of the target user equipment are allowed to proceed and a response is generated. If not, the request is denied and an appropriate procedure follows. For example, an error message, or request denied message may be sent to the LCS client.

If a nickname or similar is used, the nickname translation function 22 may be needed to translate the identifier into a form that can be verified against the list 19 stored in the database 18.

The identifier may be added to all location requests between a LCS Client 12 and a LCS Server entity 10, such as the GMLC. The identifier may be added to the request by the requesting user equipment 7 or by the LCS client 12.

Capacity to carry the identifier parameter may be added to a protocol defining the so called Le interface between the GMLC 10 and a location server client entity 12. The current Le interface is described more detail e.g. in the above referenced 3GPP Technical Specification 23.271.

FIG. 3 shows another embodiment wherein a target user equipment 6 is enabled to authorise the provision of the location information in case-by-case basis. In here a message containing information about the identity of the requester may be sent to the target user equipment 6. A LCS Client ID may also be included in this message for added privacy. The target user may then allow or deny a positioning request on case by case basis.

Identifier such as the MSISDN or similar unique identifier may be forwarded to the target user equipment 6 as a part of a LCS Client notification message. A possibility is to associate the identifier information with the name of the requester at the target user equipment. The identifier information may for example be directed to the phone book of the target user equipment 6 so that the MSISDN is translated into a name based on a phone book entry. Now the user has the possibility to allow or deny the positioning request based on actual 1 information.

Said Information about the requester may also comprise the name or nickname of the requester. The name may be included into the message to the target user equipment either instead or in addition to other identifiers, such as the MSISDN. The target user equipment 6 may then display the name directly as indicated by the message.

A specific client name parameter referred to as 'client name' may be added to the message. The client name parameters as such is known from other applications, and has been proposed to be used in various standards. It is therefore not explained in any great detail herein. It is sufficient to note that the client name parameter may consists of a text string. For example, GSM release 98 defines a client name parameter capable of containing a text string of the maximum length of 63 characters. Since substantially long character strings are possible, the client name parameter may include both the name or the requester and the name of the LCS client.

The parameter including the name of the requester is preferably included into the message by the LCS client 12. The parameter may then be transported via the so called Le interface between the LCS client 12 and the LCS server 10. The parameter may then be transported via the so called Lg interface between the LCS server 10 and the radio network of the communication system serving the target user equipment and further to the target user equipment 6.

According to a possibility the name/nickname is already inserted in the request at the requester user equipment 7. The requester user equipment may accomplish this automatically, or the user thereof may input his name. For added security, the LCS client 12 or any other appropriate entity at the network may verify the name.

The target user equipment may prompt the user and ask form his/hers confirmation whether the request should be approved or not. According to a possibility the user equipment responds automatically based on information regarding authorised/non-authorised requestors stored in the database thereof.

In the FIG. 3 embodiment a verification is not necessarily needed at the network. Instead, the identity of the requester may be added to a notification sent to the target user equipment 6 and the authorisation may be done at the target user equipment. However, a verification based e.g. on the list 19 of FIG. 1 may still be used in here e.g. for improved safety thereby providing a double check feature. The target user may also wish to receive the notifications e.g. only on certain times while at the rest of the times he/she may wish to rely on the authorisation list.

The processing of the requests and authorisations may need addition of a notification processing capability at the target user equipment 6. However, this is an implementation issue, and may be accomplished by mean of the existing processor and data processing hardware of the user equipment, and will thus not be discussed any more detail herein.

In the above the identifier was described as being on the Mobile Subscriber ISDN (MSISDN) number of the user. Other possibilities for the unique identifier include the IMSI, TIMSI, password, and so on. In principle the identifier may be any anything as long as it can be processed by the PLMN system so that the verification can be made based on it.

Responses by the LCS client 12 to location information requests may have the form of simple coordinate (x, y) information or contain more value added services like a reverse-geocoded response provided with a street name or a map reference. The response may even comprise a map and a pointer on the map.

For Emergency and Lawful intercept location services this parameter may not be needed depending on local legislation. The function may be overrode e.g. if the request comes from an emergency service.

It should be appreciated that the elements of the location service functionality may be implemented anywhere in the telecommunications system. The location service implementation may also be distributed between several elements of the system. Furthermore, although the above describes embodiments employing a specific LCS client node, this is not a necessity. The request for location information may be addressed directly to a location service entity of the communication system, such as to the GMLC or any other element associated with the provision of location information. If a LCS client is used, it does not need to be an external element, but may also be implemented within the communication network and/or be run the by the operator of the network.

According to an embodiment the target user equipment 6 itself provides at least part of the information required by the LSC client, that is at least a part of the information is provided directly by the target user equipment instead of e.g. the GMLC. The user equipment 6 may be provided with the location service processing function and is capable of generating and transporting location information thereof to the clients via the core network and/or the LSC server.

According to an embodiment a plurality of target user equipment is grouped into one or more "location service groups", each of these groups being provided with an unique identifier that may then be used for preventing unauthorised provision of location information regarding any member of the group. The group may consist of subscribers that are of a predefined type, such as personnel of an organisation, members of a family or any other group of users that may be grouped together based on an appropriate criteria and may have similar needs regarding the selective prevention of location information provision.

It should be appreciated that whilst embodiments of the present invention have been described in relation to user equipment such as mobile stations, embodiments of the present invention are applicable to any other suitable type of user equipment.

The embodiment of the present invention has been described in the context of a third generation communication system. This invention is also applicable to any other communication system.

It is also noted herein that while the above describes exemplifying embodiments of the invention, there are several variations and modifications which may be made to the disclosed solution without departing from the scope of the present invention as defined in the appended claims.

The invention claimed is:

1. A method in a communication system, the method comprising:
    signaling to a location middleware server entity a request for location information associated with a target user, said request containing information identifying a requester of said location information;
    verifying based on said identifying information if the target user has authorized the requester to initiate provision of location information that associates with the target user; and
    if the requester is authorized by the target user to initiate provision of location information that associates with the target user, sending said request from said middleware server entity to a location service server entity,
    wherein said request is signaled to said location middleware server entity other than via said location server entity.

2. A method as claimed in claim 1, wherein the request is generated at a user equipment of the requester and the location service server entity is a Gateway Mobile Location Centre.

3. A method as claimed in claim 1, wherein location information associated with the target user is provided only for requesters who are determined by the target user as being authorized to receive information associated with the location of the target user.

4. A method as claimed in claim 1, wherein at least a part of the information about the authorizations by the target user is stored in a storage unit provided in the communication system.

5. A method as claimed in claim 1, wherein the at least a part of information about the authorizations by the target user is fetched from a second communication system, said second communication system being accessible for the entities of the communication system wherein the verification is performed.

6. A method as claimed in claim 4, wherein a verification entity of the communication system accomplished the verification based on said stored information and identifying information.

7. A method as claimed in claim 1, wherein the verification comprises verifying if an identifier of the requester can be found from a list of identifiers associated with the target user.

8. A method as claimed in claim 1, comprising signalling of said identifying information to the user equipment of the target user for the authorization.

9. A method as claimed in claim 8, wherein initiation of provision of location information is authorized or denied at the user equipment of the target user in response to receiving said identifying information.

10. A method as claimed in claim 8, wherein information about the authorizations by the target user is stored in storage unit provided at the user equipment of the target user, and wherein the user equipment verifies based on the received information if the storage unit of the user equipment contains an authorization for the requester.

11. A method as claimed in claim 8, wherein said identifying information comprises the name or nickname of the requester.

12. A method as claimed in claim 11, wherein the name or nickname is contained in a client information parameter.

13. A method as claimed in claim 8, wherein the user of the user equipment authorizes the requester on a case by case basis.

14. A method as claimed in claim 1, comprising translation of an identifier to a format based on which the verification can be performed.

15. A method as claimed in claim 1, comprising modifying information about the authorizations by the target user that is stored in storage unit by the user equipment of the target user.

16. A communication system comprising:
a location service server entity;
a location middleware server entity;
communication media configured to signal from a client entity to the location middleware server entity a request to initiate provision of location information associated with a target user, said request containing information to identify a requester of said provision of location information; and
a verification unit configured to verify based on said identifying information if the target user has authorized the requester, wherein said request to initiate provision of location information is from said location middleware server entity sent to said location service server entity only if such authorization is given,
wherein said request is signaled to said location middleware server entity other than via said location service server entity.

17. A system according to claim 16, wherein the location service server entity is a Gateway Mobile Location Centre.

18. A location middleware server for use in a communication system, the location middleware server being configured to receive a request for location information associated with a target user, said request containing information identifying a requester of initiate provision of location information and to verify based on said identifying information if the target user has authorized the requester, whereby the location middleware server sends said request to initiate provision of location information to a location service server only for requesters authorized by the target user, and wherein said request is signaled to said location middleware server entity other than via said location service server entity.

19. A location middleware server according to claim 18, wherein the location service server is a Gateway Mobile Location Centre.

20. A communication system comprising:
a location service server entity;
a location middleware server entity;
communication media for signaling from a client entity to the location middleware server entity a request for location information associated with a target user, said request containing information identifying a requester of said location information; and
verification means for verifying based on said identifying information, if the target user has authorized the requester, wherein said request to initiate provision of location information is from said location middleware server entity sent to said location service server entity only if such authorization is given,
wherein said request is signaled to said location middleware server entity other than via said location service server entity.

* * * * *